(12) United States Patent
Suzuki et al.

(10) Patent No.: US 6,170,629 B1
(45) Date of Patent: Jan. 9, 2001

(54) FRICTION PLATE

(75) Inventors: Hirotsugu Suzuki, Shizuoka-ken; Takayuki Watanabe, Fukuroi; Masaki Sakai, Shizuoka-ken, all of (JP)

(73) Assignee: NSK Warner K.K., Tokyo (JP)

( * ) Notice: Under 35 U.S.C. 154(b), the term of this patent shall be extended for 0 days.

(21) Appl. No.: 09/343,461

(22) Filed: Jun. 30, 1999

(30) Foreign Application Priority Data

Jul. 6, 1998 (JP) .................................................. 10-190152

(51) Int. Cl.$^7$ .................................................. F16D 13/68
(52) U.S. Cl. ..................................... 192/107 R; 156/258
(58) Field of Search ........................ 192/107 R, 70.14; 156/258, 266

(56) References Cited

U.S. PATENT DOCUMENTS

| | | | |
|---|---|---|---|
| 3,467,229 | * 9/1969 | Diebel | 192/107 R X |
| 3,759,354 | * 9/1973 | Dowell et al. | 192/107 R X |
| 4,010,831 | * 3/1977 | Reuter | 192/107 R X |
| 4,260,047 | 4/1981 | Nels | 192/70.14 |
| 4,674,616 | 6/1987 | Mannino, Jr. | 192/107 R |
| 5,232,075 | * 8/1993 | Mohan | 192/107 R X |
| 5,713,450 | * 2/1998 | Quigley | 192/107 R |
| 5,954,172 | * 9/1999 | Mori | 192/107 R X |

* cited by examiner

Primary Examiner—Rodney H. Bonck
(74) Attorney, Agent, or Firm—Vorys, Sater, Seymour and Pease LLP

(57) ABSTRACT

In a friction plate formed by adhering a plurality of friction material segments having connecting portions to be interconnected to each other onto a core plate, a frictional engagement surface side portion of each connecting portion between the friction material segments is formed as a recessed portion.

19 Claims, 3 Drawing Sheets

FRICTION PLATE

BACKGROUND OF THE INVENTION

1. Field of the Invention

The present invention relates to an improvement in friction plates used, for example in a multiple-plate friction engagement apparatus, such as a lock-up clutch in an automatic transmission of a motor vehicle or in a transmission of a motor bike.

2. Related Background Art

In the past, a friction plate has been manufactured by adhering a plurality of friction material segments to an annular core plate in an annular fashion. For example, as shown in FIGS. 3 and 4, the segments have been interconnected by connecting portions configured similar to pieces of jigsaw puzzles.

However, when the friction material segments are stamped from a friction material tape, burrs can be generated at ends of the stamped friction material segments.

FIG. 6 is a sectional view showing conventional connecting portions in detail. Friction material segments 12 are adhered to the surface of a core plate 11 in such a manner that burrs formed on connecting portions 16 of the stamped friction material segments 12 are protruded from a frictional engagement surface, i.e., toward an associated member 17.

In the above-mentioned conventional friction plate, if the friction material segments are adhered to the core plate in such a manner that the burrs are protruded toward the associated member, the friction material is locally contacted with the associated member via the burrs, with the result that the connecting portions of the friction material segments may be peeled or ripped off.

SUMMARY OF THE INVENTION

Accordingly, an object of the present invention is to provide a friction plate in which connecting portions of friction material segments can be prevented or suppressed from being peeled or ripped off and which has excellent endurance.

To achieve the above object, the present invention provides a friction plate formed by adhering a plurality of friction material segments having connecting portions to be interconnected onto a core plate, wherein frictional engagement surface side portions (portions constituting a part of the frictional engagement surface) of the connecting portions of the friction material segments are formed as recessed portions.

Since the frictional engagement surface side portions of the connecting portions of the friction material segments are formed as the recessed portions, for example, by boring, chamfering or compression, there is no projection protruded toward an associated member, with the result that the connecting portions are not locally contacted with the associated member, thereby preventing the connecting portions from being peeled or ripped off.

DESCRIPTION OF THE PREFERRED EMBODIMENTS

Figure 1:
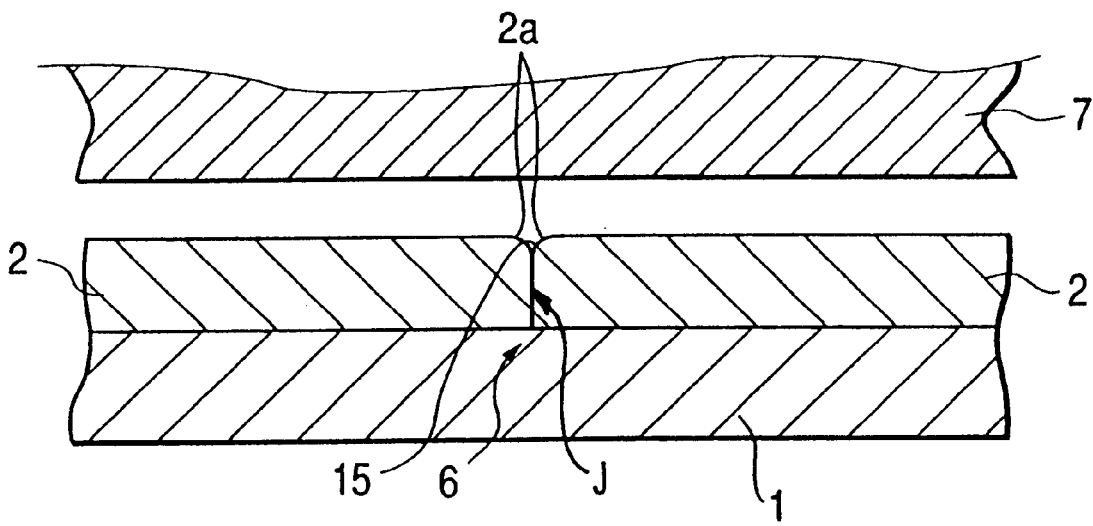
FIG. 1 is a sectional view showing connecting portions of a friction plate according to an embodiment of the present invention.

The present invention will now be fully explained in connection with an embodiment thereof with reference to the accompanying drawings. Incidentally, in the drawings, the same elements are designated by the same reference numerals.

Figure 3:
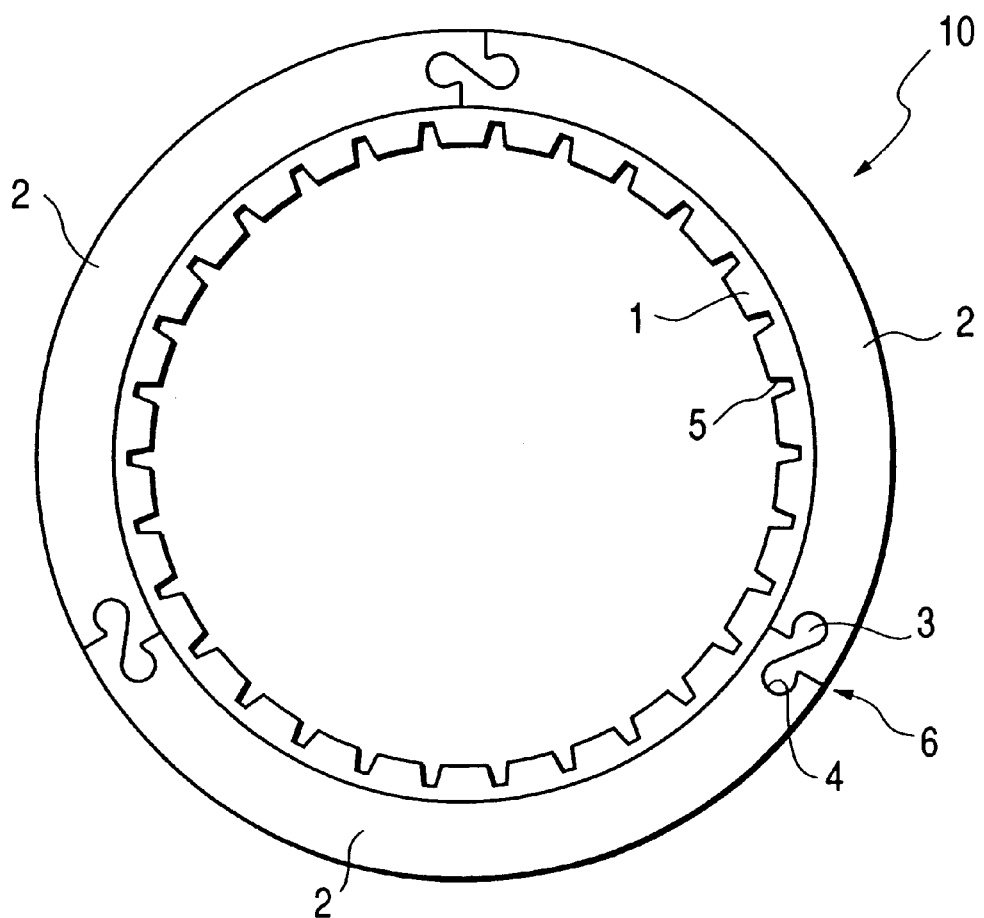
FIG. 3 is a front view of a friction plate to which the present invention can be applied.
Figure 4:
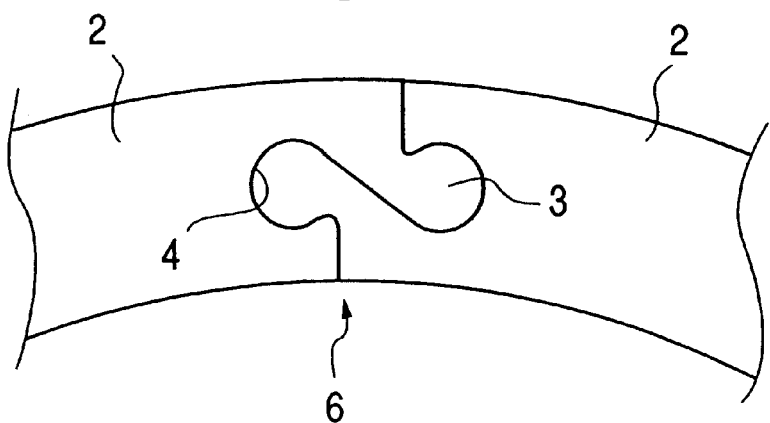
FIG. 4 is a front view showing connecting portions of friction material segments of FIG. 3 in detail.

FIG. 3 shows a friction plate to which an embodiment of the present invention can be applied and which is formed by adhering a plurality of friction material segments stamped from a friction material tape or sheet to a core plate. FIG. 4 is an enlarged view showing connecting portions of the friction plate of FIG. 3.

The friction plate 10 is formed by adhering the plurality of friction material segments 2 to the annular core plate 1 having internal splines 5 to be engaged by a rotary member (not shown). In the illustrated embodiment, the entire circumference of the core plate 1 is covered by three friction material segments 2. Both circumferential ends of the friction material segments have complementary shapes each having a projection 3 at one side and a recess 4 (to be engaged by the projection 3 of the adjacent segment) at the other side. By combining the circumferential ends of the adjacent friction material segments, a connecting portion 6 for interconnecting adjacent friction material segments 2 is formed.

FIG. 4 shows the connecting portion 6 in detail. The circumferentially protruding projection 3 is formed on one circumferential end of one friction material segment 2, and the recess 4 is formed in one circumferential end of the other friction material segment 2. The projection 3 and the recess 4 have complementary shapes to be fitted together substantially without any gap.

The projection 3 of the connecting portion 6 may have a shape other than the illustrated shape. In such a case, it should be understood that the corresponding recess 4 has a complementary shape. Further, in the illustrated embodiment, while an example that three friction material segments 2 are adhered to the core plate 1 along the circumferential direction was explained, it should be understood that the number of the segments can be changed to, for example, two or any number such as four or more, if necessary.

FIG. 1 is a sectional view of the friction plate 10, showing the connecting portion 6 between the friction material segments 2 of FIG. 3. The connecting portion 6 between the friction material segments 2 adhered to the core plate 1 by adhesive or the like is defined by fitting the projections 3 into the recesses 4. The stamped friction material segments are installed so that the burrs on the projection 3 and the recess 4 are directed toward the core plate 1 and bored portions 2a are positioned on a frictional engagement surface opposed to an associated member 7. As a result, the bored portions 2a are opposed to each other to form a recessed portion 15 overlying the abutted junction J of the friction material segments 2. With this arrangement, the frictional engagement surface frictionally engaged by the associated member 7 can be prevented from being peeled or ripped off.

Figure 2:
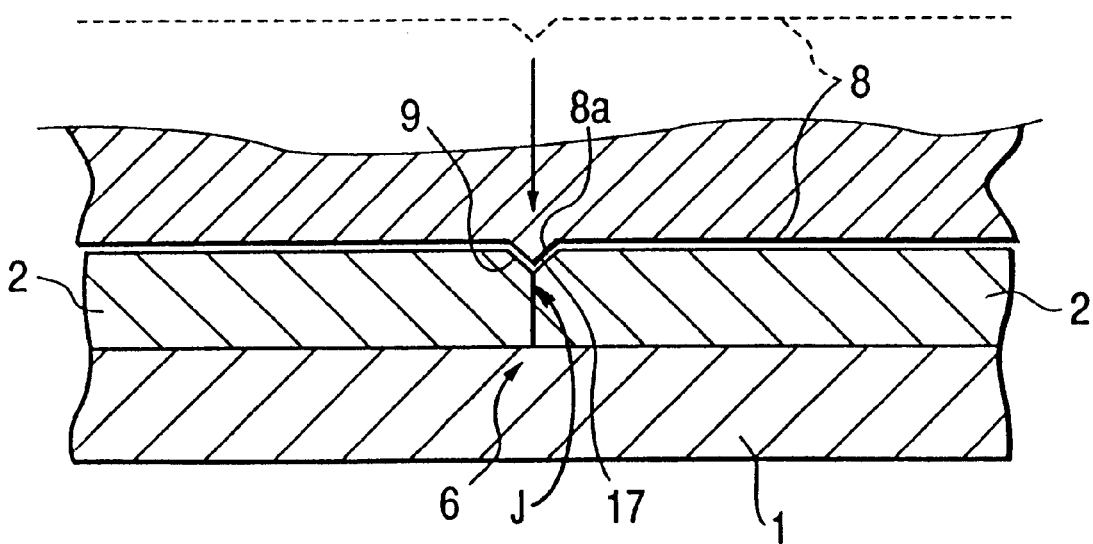
FIG. 2 is a sectional view of a friction plate showing an alteration of recessed portions.

FIG. 2 shows an alteration of the aforementioned embodiment, in which a recessed portion 17 of the connecting portion 6 is formed by another method. In FIG. 2, the connecting portion 6 between the friction material segments 2 is compressed by an urging member 8 from the above (from a direction shown by the arrow) to form the recessed portion 17.

The urging member 8 comprises a flat plate member provided with ridge 8a having a configuration corresponding to the configuration of the border between the projection 3 and the recess 4 of the connecting portion 6. By urging the ridge 8a against the connecting portion 6, the recessed portion 17 is formed in the connecting portion 6. In this alteration, the recessed portion 17 is formed between inclined surfaces 9 along the surfaces of the ridge 8a.

The recessed portion 17 can be formed by removing corners of the connecting portion by chamfering, rather than using the urging member 8.

Figure 5:
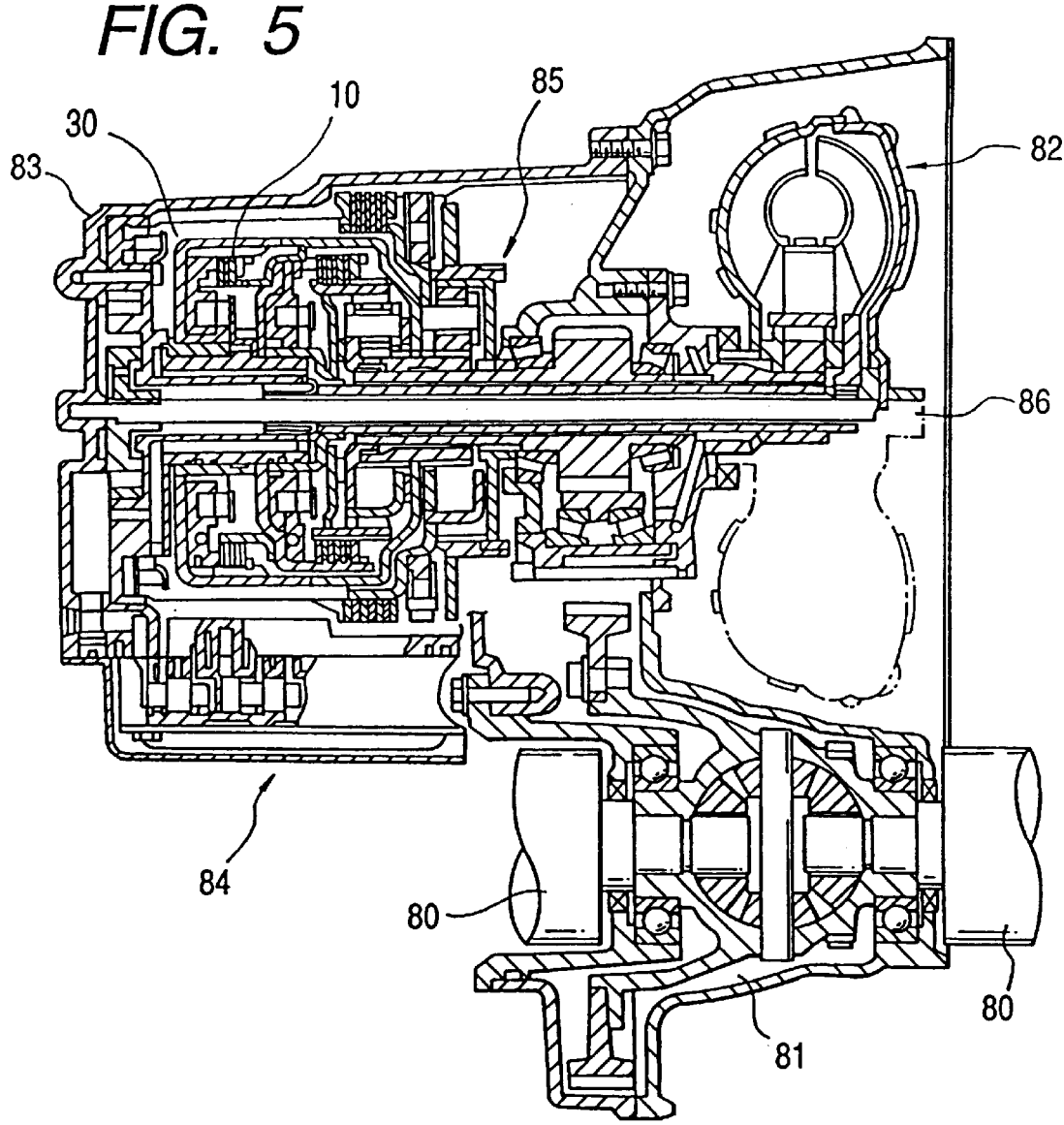
FIG. 5 is a sectional view of an automatic transmission to which the friction plates of the present invention can be applied.
Figure 6:
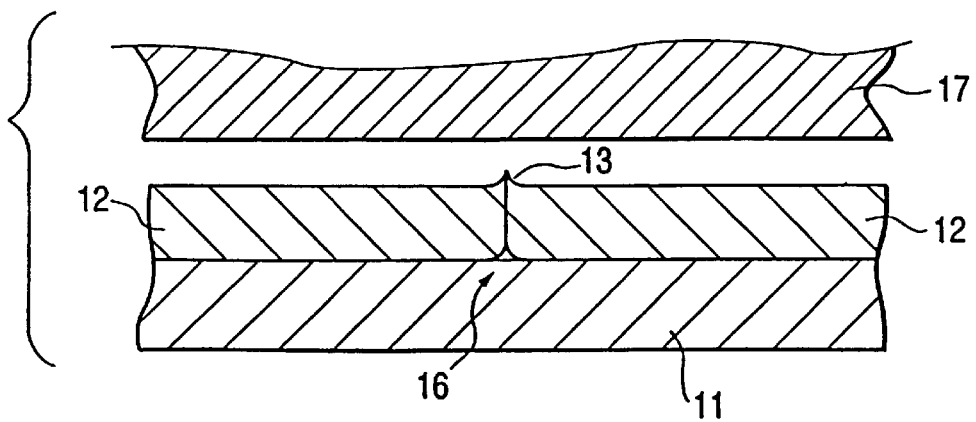
FIG. 6 is a sectional view of a conventional friction plate.

FIG. 5 is a sectional view of an automatic transmission for a front wheel drive motor vehicle (FF vehicle) using the friction engaging device to which the friction plate according to the present invention is applied. Power from an engine is transmitted to each stage of the transmission through a torque converter 82 and an input shaft 86. A clutch drum 30 is disposed within a transmission casing 83. Gears are properly selected by a planetary gear mechanism 85. In this case, connection or disconnection of the power with respect to a drive system is effected by a multiple-plate friction engaging device (i.e., a multiple-plate clutch) incorporating therein the friction plate 10. A control valve mechanism 84 is disposed at a lower part of the transmission casing 83. The power from the transmission is transmitted to vehicle wheels (not shown) through a differential gear mechanism 81 and an output shaft 80.

According to the friction plate of the present invention as mentioned above, the following advantages can be obtained.

Since there are no burrs directing toward the associated member, there is no portion locally contacted with the associated member, with the result that peeling or ripping-off can be prevented or suppressed.

As a result, the friction plate of friction material segment connecting type having excellent endurance can be obtained.

What is claimed is:

1. A friction plate, comprising:
   a core plate; and
   a plurality of friction material segments each having a first side mounted to the core plate and a second side opposite the first side, the second side including a friction engagement surface;
   wherein at least one pair of adjacent friction material segments are interconnected by abutting connecting parts thereof, said connecting parts being configured on the second sides of the adjacent segments so as to define a recessed portion overlying an abutted junction of said connecting parts.

2. A friction plate according to claim 1, wherein said recessed portion is formed by portions generated by stamping said friction material segments.

3. A friction plate according to claim 1, wherein said recessed portion is formed by portions generated by chamfering said connecting parts.

4. A friction plate according to claim 1, wherein said recessed portion is formed by portions generated by compression of said connecting parts.

5. A friction plate according to claim 1, wherein said connecting parts have complementary shapes.

6. A friction plate according to claim 1, wherein the first sides of said friction material segments are adhered to said core plate.

7. A friction plate according to claim 1, wherein said recessed portion extends along said core plate substantially coextensively with said abutted junction of said connecting parts.

8. A friction plate according to claim 7, wherein the core plate is annular and the friction material segments are mounted in an annular arrangement.

9. A friction plate according to claim 1, wherein the core plate is annular and the friction material segments are mounted in an annular arrangement.

10. A friction plate according to claim 1, wherein said connecting parts have abutted marginal portions of reduced thickness.

11. A method of making a friction plate, comprising:
    providing a plurality of friction material segments each having a first side and a second side opposite the first side, the second side including a friction engagement surface;
    mounting the first sides of the friction material segments to a core plate, with at least one pair of adjacent friction material segments being interconnected by abutting connecting parts thereof; and
    wherein said connecting parts are configured on the second sides of the adjacent segments to define a recessed portion overlying an abutted junction of said connecting parts.

12. A method according to claim 11, wherein said recessed portion is formed by portions generated by stamping said friction material segments.

13. A method according to claim 11, wherein said recessed portion is formed by portions generated by chamfering said connecting parts.

14. A method according to claim 11, wherein said recessed portion is formed by portions generated by compression of said connecting parts.

15. A method according to claim 11, wherein said connecting parts have complementary shapes.

16. A method according to claim 11, wherein the first sides of said friction material segments are adhered to said core plate.

17. A method according to claim 11, wherein said recessed portion extends along said core plate substantially coextensively with said abutted junction of said connecting parts.

18. A method according to claim 17, wherein the core plate is annular and the friction material segments are mounted in an annular arrangement.

19. A method according to claim 11, wherein the core plate is annular and the friction material segments are mounted in an annular arrangement.

* * * * *